United States Patent
Lepron et al.

(10) Patent No.: US 11,854,409 B2
(45) Date of Patent: Dec. 26, 2023

(54) ELECTRONIC DISPLAY MANAGEMENT DEVICE FOR A HEAD-UP DISPLAY SCREEN AND ASSOCIATED DISPLAY SYSTEM, MANAGEMENT METHOD AND COMPUTER PROGRAM PRODUCT

(71) Applicant: Thales, Courbevoie (FR)

(72) Inventors: Nicolas Lepron, Merignac (FR); Daniel Maulet, Merignac (FR); Emilie Bruel, Merignac (FR)

(73) Assignee: THALES, Courbevoie (FR)

( * ) Notice: Subject to any disclaimer, the term of this patent is extended or adjusted under 35 U.S.C. 154(b) by 288 days.

(21) Appl. No.: 17/318,823

(22) Filed: May 12, 2021

(65) Prior Publication Data
US 2021/0366293 A1 Nov. 25, 2021

(30) Foreign Application Priority Data
May 19, 2020 (FR) .................................. 20 05015

(51) Int. Cl.
*G08G 5/00* (2006.01)
*G02B 27/00* (2006.01)
*G02B 27/01* (2006.01)

(52) U.S. Cl.
CPC ........ *G08G 5/0021* (2013.01); *G02B 27/0093* (2013.01); *G02B 27/0101* (2013.01); *G02B 27/0179* (2013.01); *G08G 5/0056* (2013.01); G02B 2027/0141 (2013.01); G02B 2027/0181 (2013.01); G02B 2027/0187 (2013.01)

(58) Field of Classification Search
CPC ............... G08G 5/0021; G08G 5/0056; G02B 27/0093; G02B 27/0101; G02B 27/0179; G02B 2027/0141; G02B 2027/0181; G02B 2027/0187
See application file for complete search history.

(56) References Cited

U.S. PATENT DOCUMENTS 8,576,093 B2 * 11/2013 Flotte ..................... G01C 23/00
340/963
2020/0116518 A1 * 4/2020 Lee ....................... G01C 21/365

FOREIGN PATENT DOCUMENTS

JP 2021518679 A * 8/2021

OTHER PUBLICATIONS

Jung Hoon Seo, A Study on Multi-depth Head-Up Display, 2017, SID 2017 Digest (Year: 2017).*

(Continued)

*Primary Examiner* — Curtis A Kuntz
*Assistant Examiner* — James E Munion
(74) *Attorney, Agent, or Firm* — ArentFox Schiff LLP (57) ABSTRACT

The invention relates to an electronic device for managing the display of a head-up display system capable of being embarked in a cockpit of an aircraft piloted by at least one pilot and comprising:
- a display module configured to display a plurality of symbols relative to the operation of the aircraft and its environment in at least two distinct visualization planes, the visualization planes each having a distinct depth along a line of sight from the pilot,
- a determination module configured to determine a reference visualization plane corresponding to an accommodation plane of the eye of the pilot and
- a warning module configured to generate a warning to be displayed in the reference visualization plane.

11 Claims, 4 Drawing Sheets

(56) References Cited

OTHER PUBLICATIONS

French Search Report, from the French Patent Office in counterpart French Application No. 2005015 dated Feb. 4, 2021.
Seo, J., et al. "P-175: A Study of Image Distortion and Brightness-Uniformity Compensation in a Laser Projection System Using a 2-D MEMS Scanner," Society for Information Display Digest of Technical Papers, vol. 41, Issue 1, pp. 1922-1925, Mar. 25, 2010.
Seo, J., et al. "A Study on Multi-depth Head-Up Display," Society for Information Display Digest of Technical Papers, Book 2: Session 59, pp. 883-885, May 10, 2017 (http://doi.org/10.1002/sdtp.11767 as viewed Feb. 4, 2021).

* cited by examiner

ELECTRONIC DISPLAY MANAGEMENT DEVICE FOR A HEAD-UP DISPLAY SCREEN AND ASSOCIATED DISPLAY SYSTEM, MANAGEMENT METHOD AND COMPUTER PROGRAM PRODUCT

CROSS-REFERENCE TO RELATED APPLICATIONS

This application is a U.S. non-provisional application claiming the benefit of French Application No. 20 05015, filed on May 19, 2020, which is incorporated herein by reference in its entirety.

FIELD OF THE INVENTION

The present invention relates to an electronic display management device of a head-up display system suitable for being embarked in an aircraft.

The present invention also relates to a method for managing the display of a head-up display system adapted to be embarked in an aircraft.

The present invention also relates to a computer program product comprising the software instructions which, when implemented by a computer equipment, implements such a display management method.

The invention relates more particularly to a helicopter, while being applicable to any type of aircraft, such as an airplane or a drone.

The invention relates in particular to the field of displaying symbols, such as indicators, counters, targets, warnings, etc. on a display system, known as head-up, which thus makes it possible to project the symbols in front of the pilot of the aircraft via, for example, a head-up display screen.

BACKGROUND

It is known to display these symbols in the same visualization plane, projected for example to infinity. The eyes of the pilot then accommodate in order to focus the vision of the pilot to infinity and thus see the symbols clearly.

The display of the symbols can be in conforming and/or non-conforming view. This results in cases of superimposition of different symbols that make it difficult to read the information related to these superimposed symbols, which can lead the pilot to ambiguous readings, and even in some cases to miss a warning.

There is therefore a need to obtain a display that makes it easier for the pilot to read the symbols, in order to reduce these ambiguities and limit the risk of missing a warning.

SUMMARY

The object of the invention is thus to propose an electronic display management device that makes the displayed symbols easier to read and thus offers better safety for the aircraft.

To this end, the invention has as its object an electronic display management device of a head-up display system adapted to be embarked in a control station of an aircraft piloted by at least one pilot, the electronic display device comprising a display module configured to display a plurality of symbols relative to the operation of the aircraft and to the aircraft environment via the head-up display system, in at least two distinct visualization planes, the visualization planes each being of distinct depth according to a line of sight of the pilot, a determination module configured to determine a reference visualization plane corresponding to the accommodation plane of the eye of the pilot, and a warning module configured to generate at least one warning to be displayed by the display module in the reference visualization plane.

Thus, the symbols are displayed in at least two distinct visualization planes, by stereoscopy or holography, which make it possible to avoid the superimposition of symbols and the ambiguity which could result from it. The modules of determination and warning make it possible to determine the reference visualization plane corresponding to an eye accommodation plane of the pilot and to display a warning in this reference visualization plane, in order to make sure that the pilot sees the warning clearly and does not miss it.

The device according to the invention thus makes it possible to reduce reading ambiguities between symbols, thanks to the different visualization planes, while ensuring that the pilot does not miss a warning that could occur if a warning is displayed in a plane different from the one to which he is accommodating.

Thus the device according to the invention allows the pilot to read the symbols more easily while guaranteeing a better reactivity to the warnings, and thus a better safety for the flight of the aircraft.

According to other advantageous aspects of the invention, the electronic management device includes one or more of the following features, taken in isolation or in any technically possible combination:

- the electronic device further comprises a module for tracking the movement of the pilot's eyes, the tracking module being configured to calculate the accommodation plane of the eyes of the pilot from the respective orientation of each eye of the pilot, and the determination module being configured to determine the reference visualization plane from the calculated accommodation plane;
- the determination module is configured to determine, as the reference visualization plane, successively, each of the visualization planes of a predefined set of visualization planes;
- when two symbols are aligned along the line of sight, the display module is configured to display the said symbols in two different visualization planes;
- the symbols comprise conforming and/or non-conforming symbols, with the display module being configured to display the conforming symbols in a single visualization plane,
- the single visualization plane is the deepest visualization plane;
- the display module is configured to display each symbol with a light intensity that increases with depth between the pilot and the visualization plane related to the said symbol; and
- the warning is selected from the group consisting of: a warning on the height of the aircraft above the ground; a warning on the speed of the aircraft; a warning on an aircraft malfunction; a warning on the presence of an element of interest in the aircraft environment; a warning on the location of a target out of the field of vision of the pilot; and a warning on the location of a sighting of the co-pilot.

The invention also relates to a head-up display assembly comprising a head-up display system suitable for placement in a cockpit of an aircraft, and an electronic display management device as defined above.

The invention also has as object a method for managing the display of a head-up display system suitable for being embedded in a cockpit of an aircraft piloted by at least one pilot, the display management method comprising at least the following steps:

> display of a plurality of symbols relative to the operation of the aircraft and to the environment of the aircraft via the head-up display system, in at least two distinct visualization planes, the visualization planes each having a distinct depth along a line of sight from the pilot,
> determination of a reference visualization plane corresponding to an accommodation plane of the eyes of the pilot, and
> generation of at least one warning to be displayed by the display module in the reference visualization plane.

The invention also has as object, a non-transitory computer-readable medium including a computer program comprising software instructions which, when executed by a computer, implement a management method as defined above.

BRIEF DESCRIPTION OF THE DRAWINGS

These features and advantages will be described in detail in the following description, given only by way of illustration and not limiting, with reference to the accompanying drawings, in which.

DETAILED DESCRIPTION

In the following, the term "vertical" is generally understood in relation to the direction of the force of gravity. The term "horizontal" is generally understood to be perpendicular to the vertical direction.

Thereafter, the invention is described by considering an aircraft 10. However, the person skilled in the art will understand that the invention is applicable to any type of vehicle, such as an aircraft, a motor vehicle, or a railway vehicle.

The aircraft 10 is for example an airplane, a helicopter, or a drone flying over the terrain 12. In other words, the aircraft 10 is a flying machine piloted by a pilot 14 via a control station 16, the cockpit 16 being located inside the aircraft 10 or remotely from the aircraft, in particular in the case of a drone.

Figure 1:
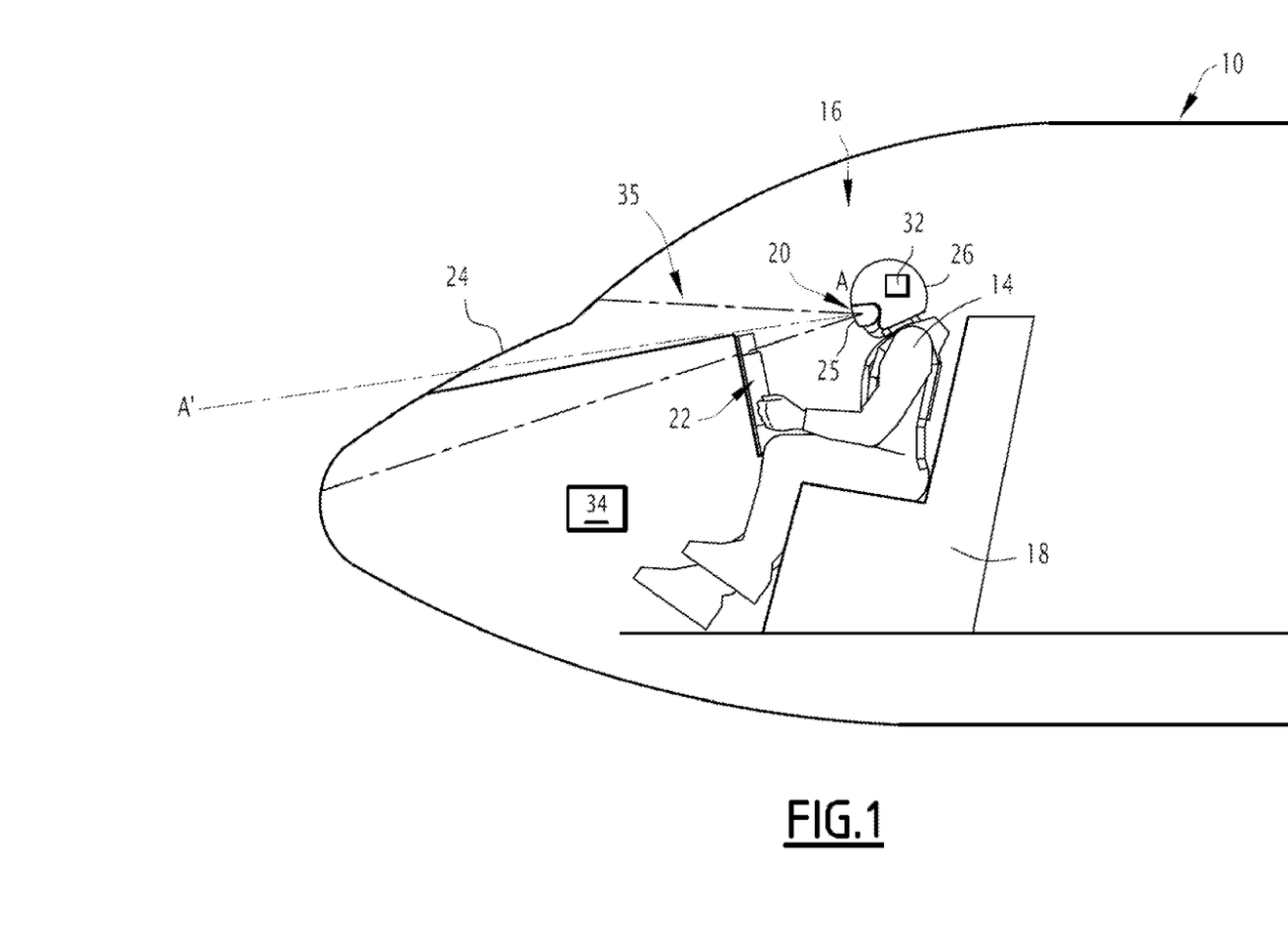
FIG. 1 is a schematic side view of an aircraft cockpit.

The control station 16 is here a cockpit of aircraft 10. As seen in FIG. 1, the cockpit 16 comprises at least one seat 18 for the pilot 14, at least one head-up display assembly, advantageously at least one head-down display screen 22, and at least a partially transparent windscreen 24 separating the interior of the cockpit from the exterior environment of the aircraft 10 and an orientation sensor 32.

The head-up display assembly comprises a head-up display system and an electronic device 34 for management of the head-up display system.

In one embodiment, the head-up display system is a head-up display 20.

Alternatively, the head-up display system is a head-up holographic display device configured to show at least one three-dimensional image in front of the pilot 14 using the interference of two laser beams, without the need for a display screen.

The head-up display screen 20 is at least partially transparent. Advantageously, the head-up display screen 20 is a visor 25 integrated into a helmet 26 suitable to be worn by the pilot 14, as shown in FIG. 1. Alternatively, the head-up display screen 20 is a transparent surface fixed in the cockpit and placed in front of the pilot 14. Alternatively, the head-up display screen 20 is the windscreen 24.

The head down display screen 22 is a surface configured to display at least one image. Advantageously, the head down display screen 22 is configured to display information related to the aircraft 10, such as the speed, altitude, orientation of the aircraft 10 and/or information relative to the external environment of the aircraft 10, such as air traffic information and weather conditions in the vicinity of the aircraft 10.

According to another embodiment, not shown, the aircraft 10 is a UAV (unmanned aerial vehicle) that can be remotely piloted via a control station 16, for example a ground control station, from which the UAV is piloted. The control station 16 comprises here at least the seat 18 of the pilot 12 and the head-up display screen 20, advantageously at least one head-down display screen 22 and at least one environment display screen, not shown. The environment display screen is configured to display the external environment of the aircraft 10 filmed from at least one camera onboard the UAV.

The orientation sensor 32 is capable of determining an A-A' line of sight for the eyes 33 of the pilot 14. As can be seen in FIG. 1, the A-A' line of sight relative to a predetermined solid angle defines a field of view 35.

The head-up display 20 is intended to be placed at least partially in the field of view 35.

The orientation sensor 32 is, for example, an accelerometer located in the helmet 26 of the pilot 14 and capable of determining the head posture of the pilot 14 from the measured accelerations of the helmet 26. The orientation sensor 32 is thus able to determine the line of sight A-A' from the head posture of the pilot 14 and the orientation of the aircraft 10 received by the at least one sensor 17 in the aircraft 10.

Alternatively, the orientation sensor 32 is an electromagnetic sensor capable of determining the posture of the head of the pilot 14 from the disruption of a magnetic field due to the movement of the head of the pilot 14, according to a technique well known to the man in the art.

Figure 3:
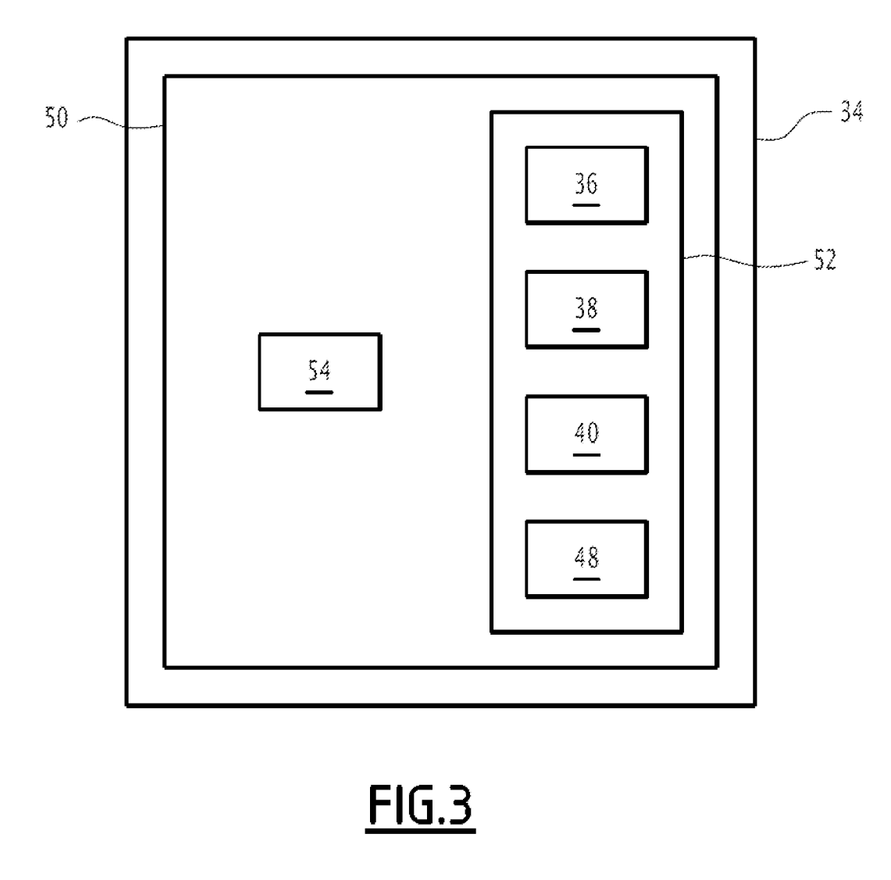
FIG. 3 is a schematic representation of an electronic display management device according to the invention.

As visible in FIG. 3, the electronic display management device 34 comprises a display module 36, a determination module 38 and a warning module 40.

Figure 2:
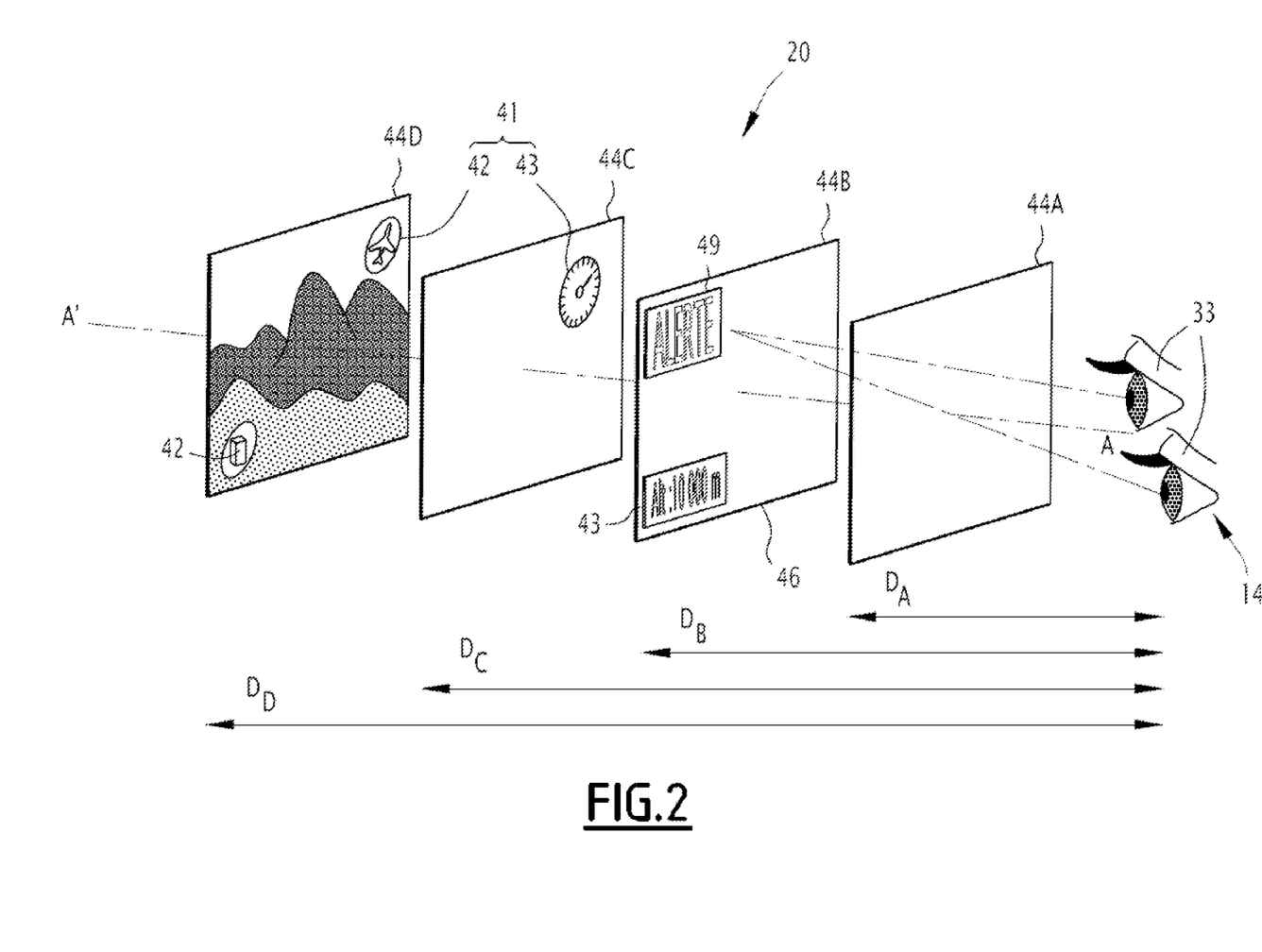
FIG. 2 is a schematic perspective representation of a head-up display screen.

The display module 36 is configured to display a plurality of symbols 41, visible in FIG. 2, relative to the operation of the aircraft 10 and the environment of the aircraft 10 on the head-up display screen 20.

The symbols 41 are, for example, indicators relating to different systems of the aircraft 10, operational counters of the aircraft 10, such as an airspeed indicator or altimeter, of buildings or vehicles of interest in the environment of the aircraft 10, warnings etc.

The symbols 41 advantageously comprise conforming symbols 42 and non-conforming symbols 43.

A conforming symbol 42 means a symbol that is conforming in at least one direction. When the symbol is conforming in all three directions of space, the conforming symbol 42 is perfectly superimposed on the terrain actually seen by the pilot 14. The conforming symbol 42 is then typically fixed in the geo-terrestrial reference frame. Alternatively, the symbol is conforming in only one or two spatial directions. For example, a symbol showing an attitude scale is only conforming according to the vertical direction, i.e. the symbol remains vertical with the roll movement of the head of the pilot 14, but moves in the other directions with the attitude movement of the head of the pilot 14.

A non-conforming symbol 43 is a symbol that is fixed in the field of view of the pilot 14.

In particular, the display module 36 is configured to display symbols 41 in at least two separate visualization planes 44A, 44B, 44C, 44D.

Advantageously, the display module 36 is configured to display the symbols 41 in a number of visualization planes 44A, 44B, 44C, 44D comprised between 2 and 4.

When the head-up display system is a head-up display screen 20, the display module 36 is configured to display the symbols 41 in stereoscopic mode.

Stereoscopy is defined as a display technique that provides the pilot 14 with the impression of DA, DB, DC and DD in depth and relief by juxtaposing two slightly different flat images, observed simultaneously and separately by each eye 33 of the pilot 14.

As visible on FIG. 2, each visualization plane 44A, 44B, 44C, 44D is related to a respective distinct depth DA, DB, DC and DD according to the line of sight A-A' from the pilot 14.

In particular, the eyes 33 of the pilot 14 accommodate in order to see clearly in an accommodation plane. Accommodation means focusing the vision of the pilot 14 by changing the curvature of the crystalline lens according to the depth of an object, so as to form a clear and sharp image on the retina of the corresponding eye 33.

Thus, when the accommodation plane merges with one of the visualization planes 44A, 44B, 44C, 44D, the pilot 14 sees in a clear way only the symbols 41 displayed in the said visualization plane 44A, 44B, 44C, 44D.

For example, in the example in FIG. 2, the eyes 33 of the pilot 14 accommodate at the level of the second visualization plane 44B.

The symbols 41 thus displayed in different visualization planes 44A, 44B, 44C, 44D are thus more easily visualized by the pilot 14 without ambiguity.

In particular, when two symbols 41 are aligned according to the line of sight A-A' of the pilot 14, the display module 36 is configured to display the said symbols 41 in two different visualization planes 44.

Thus, the two symbols 41 do not overlap and can be easily differentiated by the pilot 14 by changing the depth of the accommodation plane of his eyes 33.

In addition, the display module 36 is configured to display the conforming symbols 42 in the same visualization plane 44, advantageously in the deepest visualization plane 44D, which is located at an infinite depth.

In particular, the conforming symbols 42 are related to the terrain 12 overflown by the aircraft 10. Since the terrain is seen almost at infinity by the pilot 14, the conforming symbols 42 appear to be located in the same visualization plane 44D as the terrain 12 for the pilot 14, thus facilitating the association of the conforming symbols 42 with respect to the terrain 12.

Alternatively, the conforming symbols 42 are shown on a visualization plane 44 representative of their actual distance from the pilot 14.

In addition, the display module 36 is configured to display symbols 41 related to the same avionics function in the same visualization plane 44C, 44D, respectively.

The avionic functions are, for example, management of the speed of the aircraft 10, management of the attitude of the aircraft 10, management of the fuel of the aircraft 10, mapping of the terrain 12, management of the orientation of the aircraft 10, management of communication, etc.

Thus, the pilot 14 has the symbols 41 related to the same function in a single, visualization plane 44C 44D, and can therefore easily visualize all the information associated with this function without having to change the respective 44C, 44D visualization plane.

As an example, the ground and air speed indicators of the aircraft 10 are displayed in the same visualization plane 44C.

The display module 36 is also configured to display each symbol 41 with a light intensity of increasing value as a function of the depth $D_A$, $D_B$, $D_C$, and $D_D$ between the pilot 14 and the visualization plane 44 related to the said symbol 41.

Indeed, the more a symbol 41 is displayed at a greater depth $D_A$, $D_B$, $D_C$, and $D_D$, the less this symbol 41 stands out for the pilot 14. By displaying the symbols 41 with a light intensity that increases with the depth $D_A$, $D_B$, $D_C$, and $D_D$ the display module 36 compensates for this effect and allows the pilot 14 to visualize all the symbols 41 with the same ease.

The determination module 38 is configured to determine from the visualization planes 44A, 44B, 44C, 44D, a reference visualization plane 46 corresponding to the accommodation plane of the eye 33 of the pilot 14.

As an optional addition, the electronic display management device 34 also includes a module 48 for monitoring the eye movement of the pilot 14.

The tracking module 48 is configured to calculate the accommodation plane of the eyes 33 of the pilot 14 from the respective orientation of each eye 33 of the pilot 14.

In particular, the tracking module 48 is connected to a camera placed in the helmet 26 of the pilot and filming both eyes 33 of the pilot 14. The tracking module 48 is configured to receive and process the images filmed by the said camera and determine the respective orientation of each eye 33. From these two orientations, the tracking module 48 is able to calculate the accommodation plane of the eyes 33, and in particular the depth of the accommodation plane.

The determination module 38 is advantageously configured to detect the presence and/or state of operation of the tracking module 48.

The determination module 38 is then configured to determine the reference visualization plane 46 from the accommodation plane calculated by the tracking module 48.

In particular, the determination module 38 determines the reference visualization plane 46 by calculating the visualization plane 44B closest to the accommodation plane, in particular a possible visualization plane 44B confused with the accommodation plane.

Alternatively or in addition, the determination module 38 is configured to determine, as reference visualization plane 46, successively each of the visualization planes 44A, 44B, 44C, 44D of a predefined set of visualization planes 44A, 44B, 44C, 44D.

The determination module 38 determines all the predefined set of visualization planes 44A, 44B, 44C, 44D for example, by selecting only the visualization planes 44A, 44B, 44C, 44D corresponding to a current flight phase of the aircraft 10. The flight phase of the aircraft 10 is, for example, a takeoff phase, a cruise phase, a tactical phase, or a landing phase of the aircraft 10. As another example, the predefined set includes the reference visualization plane 46 calculated from the accommodation plane calculated by the tracking module 48 and the visualization planes 44 directly adjacent to the reference visualization plane 46.

The determination module 38 thus successively determines each of the visualization planes 44A, 44B, 44C, 44D of all the predefined set as being the reference visualization plane 46, so that at least one of these reference visualization planes 46 is the visualization plane 44B closest to the accommodation plane of the pilot 14.

The warning module 40 is configured to generate a warning 49 to be displayed by the display module 36 in the reference visualization plane 46.

The warning 49 is chosen from the group consisting of a warning on the height of the aircraft 10 above the ground, a warning on the speed of the aircraft 10, a warning of a malfunction of the aircraft 10, a warning on the presence of an element of interest in the environment of the aircraft 10, a warning on the location of a target out of the field of view 35 of the pilot 14 and a warning on the location of the sighting of a co-pilot.

The low height warning corresponds, for example, to a passage of the aircraft 10 below a predetermined threshold height, in order to warn the pilot 14 of a risk to the safety of the aircraft 10.

The speed warning corresponds, for example, to an overrun by the aircraft 10 of a predetermined threshold speed beyond which the operation of the aircraft 10 may be degraded.

A malfunction of the aircraft 10 corresponds, for example, to a failure or error in an avionics system of the aircraft 10.

The element of interest is, for example, another aircraft, an obstacle on the terrain 12 located in the vicinity of the aircraft 10 or even a place on which the aircraft is intended to land such as a hospital, an accident zone, or an offshore platform.

An example of an out-of-sight target location warning 35 is an arrow on the side of the visualization plane 44 indicating the direction in which the said target is located.

The location warning for the sighting by the co-pilot is for example a graphical representation the line of sight of the co-pilot.

As an optional complement, the display module 36 is thus able to display the warning 49 in the reference visualization plane 46 corresponding to the visualization plane 44B closest to the accommodation plane of the pilot 14.

The warning 49 is thus displayed close to the accommodation plane of the pilot 14, which allows the pilot 14 to see this warning 49 instantaneously and to react accordingly, with a low probability that he does not see the warning 49.

As an optional addition, the display module 36 is thus able to display the warning successively in the different reference visualization planes 46 among the predefined set of visualization planes 44.

In particular, the display module 36 is capable of displaying the warning 49, for example at a frequency between 2 Hz and 3 Hz, on each successive reference visualization plane 46.

In addition, the display module 36 is configured to display the warning 49 with a decreasing size depending on the $D_A$, $D_B$, $D_C$, and $D_D$ depth between the pilot 14 and the visualization plane 44 in which the warning 49 is displayed.

Thus, the greater the depth at which the warning 49 is displayed, the smaller the display size of the warning 49 will be.

In addition or as a variant, the display module 36 is able to display the warning 49 successively at predetermined depths, these depths corresponding or not to the $D_A$, $D_B$, $D_C$, and $D_D$ depths of a visualization plane 44.

For example, the display module 36 is able to display the warning 49 successively and iteratively at a depth of 5 m, then a depth of 4.5 m, then a depth of 4 m, then a depth of 3.5 m, etc.

This scanning of the planes ensures that the warning 49 is displayed close to the accommodation plane of the pilot 14. In addition, this scanning gives the impression of flashing the warning 49 in the accommodation plane of the pilot 14, which further draws the attention of the pilot 14 to the warning 49.

Adapting the display size of the warning 49 to the display depth of this warning 49 also allows for the warning 49 to be drawn even more to the attention of the pilot 14.

In the example in FIG. 3, the electronic display management device 34 comprises an information processing unit 50 consisting of, for example, a memory 52 and a processor 54 related to the memory 52. The display module 36, the determination module 38, the warning module 40, and as an optional addition the monitoring module 48 are each in the form of a software, or a software brick, executable by the processor 54. The memory 52 of the electronic display management device 34 is then able to store a head-up display software, a software for determining the reference visualization plane 46, a software for generating the warning and a software for calculating the eye accommodation plane 33 of the pilot 14. The processor 54 is then able to run each of these software programs.

In a variant not shown, the display module 36, the determination module 38, the warning module 40 and, as an optional addition, the monitoring module 48, are each realized in the form of a programmable logic component, such as an FPGA (Field Programmable Gate Array), or in the form of a dedicated integrated circuit, such as an ASIC (Application Specific Integrated Circuit).

When the electronic display management device 34 is realized in the form of one or more software programs, i.e., in the form of a computer program, it is also capable of being recorded on a medium, not shown, that is readable by a computer. The computer-readable medium is, for example, a medium capable of storing electronic instructions and of being coupled to a bus of a computer system. As an example, the readable medium is an optical disk, magneto-optical disk, ROM, RAM, any type of non-volatile memory (e.g. EPROM, EEPROM, FLASH, NVRAM), magnetic card or optical card. On the readable medium is then stored a computer program with software instructions.

Figure 4:
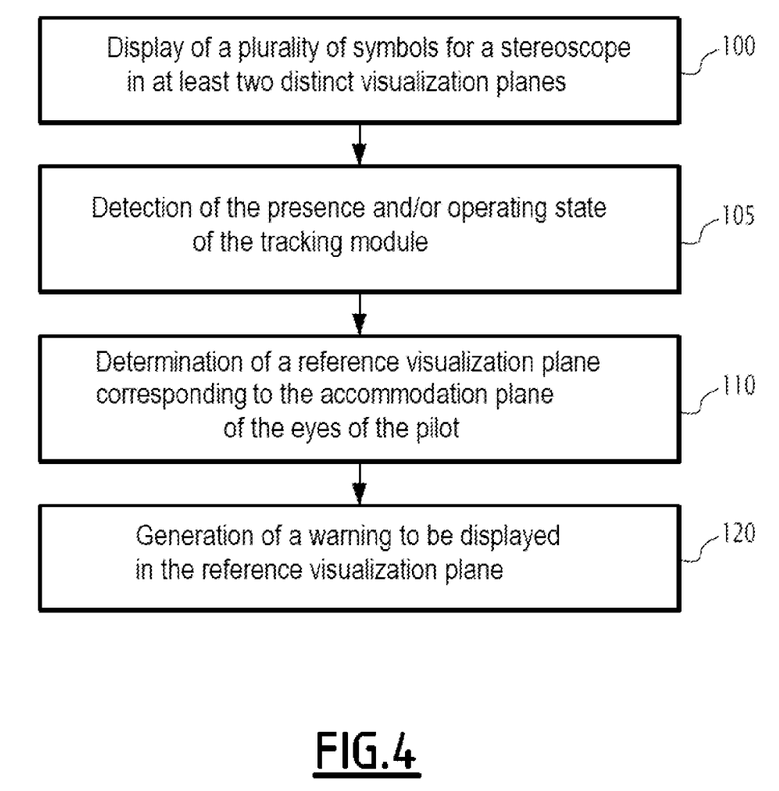
FIG. 4 is a flowchart of a method, according to the invention, for managing the display of the head-up display screen, the method being implemented by the electronic display management device of FIG. 3.

The operation of the electronic display management device 34 according to the invention will now be explained by means of FIG. 4 showing a flowchart of the method, according to the invention, of managing the display of the head-up display screen 20, the method being implemented by the electronic display management device 34.

Initially, the aircraft 10 flies over the terrain 12.

The method then comprises a first step 100 of display by the display module 36 of a plurality of symbols 41 in at least two distinct visualization planes 44.

Optionally, each symbol 41 is displayed with a luminous intensity of increasing value as a function of the depth $D_A$, $D_B$, $D_C$, and $D_D$ between the pilot 14 and the visualization plane 44A, 44B, 44C, 44D related to the said symbol 41.

Advantageously, the conforming symbols 42 are displayed in the same visualization plane 44, advantageously in the deepest visualization plane 44D.

In addition, the symbols 41 related to the same avionics function are displayed in the same visualization plane 44A, 44B, 44C, 44D.

In an embodiment of the invention, the method includes an intermediate step 105 of detection, by the determination module 38, of the presence and/or operating state of the tracking module 48.

Then, the method includes a step 110 of determining the reference visualization plane 46 corresponding to the accommodation plane of the eyes of the pilot 14.

The method then includes a sub-step of calculation, by the monitoring module 48, of the accommodation plane of the eyes of the pilot 14 from at least the respective orientation of each eye of the pilot 14.

The reference visualization plane 46 is then determined by the determination module 38 from the accommodation plane thus calculated. In particular, the reference visualization plane 46 is determined by calculating the visualization plane 44B closest to the accommodation plane.

Alternatively or as a complement, the reference visualization plane 46 is determined by the determination module 38 as being successively each of the visualization planes 44A, 44B, 44C, 44D of a predefined set of visualization planes 44A, 44B, 44C, 44D.

The method then includes a step 120 of generation by the warning module 40 of a warning 49 to be displayed in the reference visualization plane 46.

As an optional complement, the warning 49 is displayed by the display module 36 in the reference visualization plane 46 corresponding to the visualization plane 44B closest to the accommodation plane of the eye 33 of the pilot 14.

The warning 49 is thus displayed close to the accommodation plane of the eye 33 of the pilot 14, which allows the pilot 14 to see this warning instantaneously and to react appropriately, without the risk that he does not see the warning.

Alternatively, the warning 49 is displayed by the display module 36 successively in the different reference visualization planes 46.

This scanning of the reference visualization planes 46 ensures that the warning 49 is displayed close to the accommodation plane of the eye 33 of the pilot 14 and gives the impression of flashing of the warning 49 in the accommodation plane of the eye 33 of the pilot 14, which makes it possible to draw the attention of the pilot 14 even more to this warning 49.

It is then conceivable that the present invention presents a number of advantages.

Indeed, the display management device 34 according to the invention thus makes it possible to reduce the possible ambiguities of reading between the symbols 41 thanks to the various visualization planes 44A, 44B, 44C, 44D.

In addition, the functional grouping of the symbols 41 with a respective visualization plane for each function, such as an avionics function, the display of the conforming symbols 42 to infinity, and the display with a light intensity increasing with depth further reduce the ambiguities in the reading of the symbols 41.

The invention also enables the pilot 14 to limit the risk of a defect in the perception of a warning 49 that could occur if the display of this warning 49 was in a plane different from the accommodation plane of his eyes 33.

Indeed, the display management device 34 allows the warning 49 to be displayed close to the accommodation plane of the eyes 33 of the pilot 14 so that the latter visualizes the warning 49 more quickly.

Thus, the invention enables the pilot 14 to read the symbols 41 more easily, while guaranteeing a better reactivity to the warning 49, and therefore better safety for the flight of the aircraft 10 through safer piloting.

The invention claimed is:

1. An electronic display management device for a head-up display system suitable for being embarked in a cockpit of an aircraft piloted by at least one pilot, the electronic display management device comprising:
   a display module configured to display a plurality of symbols relative to the operation of the aircraft and to the environment of the aircraft via the head-up display system, in at least two distinct visualization planes, the visualization planes each having a distinct depth along a line of sight from the pilot,
   wherein it further comprises:
      a determination module configured to determine a reference visualization plane corresponding to an accommodation plane of the eye of the pilot, with the accommodation plane being the visualization plane in which vision of the pilot is sharpest, and
      a warning module configured to generate at least one warning to be displayed by the display module in the reference visualization plane.

2. The electronic device according to claim 1, further comprising a module for tracking the movement of the eyes of the pilot, the tracking module being configured to calculate the accommodation plane of the eyes of the pilot from a respective orientation of each eye of the pilot, and the determination module being configured to determine the reference visualization plane from the calculated accommodation plane.

3. The electronic device according to claim 1, wherein the determination module is configured to determine, as the reference visualization plane, successively each of the visualization planes of a predefined set of visualization planes.

4. The electronic device according to claim 1, wherein, when two symbols are aligned along the line of sight, the display module is configured to display the said symbols in two different visualization planes.

5. The electronic device according to claim 1, wherein the symbols comprise conforming symbols and non-conforming symbols, the display module being configured to display the conforming symbols in a single visualization plane.

6. The electronic device according to claim 5, in which the single visualization plane is the deepest visualization plane.

7. The electronic device according to claim 1, wherein the display module is configured to display each symbol with a depth-dependent increasing light intensity between the pilot and the visualization plane related to the said symbol, wherein the light intensity for each symbol is based on the depth of each symbol.

8. The electronic device according to claim 1, wherein the warning is selected from the group consisting of: a warning on the height of the aircraft above the ground; a warning on the speed of the aircraft; a warning on a malfunction of the aircraft; a warning on the presence of an element of interest in the environment of the aircraft; a warning on the localization of a target out of the field of view of the pilot; and a warning on the localization of the sighting of a co-pilot.

9. A head-up display assembly comprising:
   a head-up display system adapted to be placed in a cockpit of an aircraft, and
   an electronic display management device according to claim 1.

10. A display management method for a head-up display system able to be embarked in a cockpit of an aircraft piloted by at least one pilot, the display management method being implemented by an electronic display management device and comprising at least the following steps:

display of a plurality of symbols relative to the operation of the aircraft and to the environment of the aircraft via the head-up display system, in at least two distinct visualization planes, the visualization planes each having a distinct depth along a line of sight from the pilot, wherein it further comprises the following steps:

determination of a reference visualization plane corresponding to an accommodation plane of the eyes of the pilot, with the accommodation plane being the visualization plane in which vision of the pilot is sharpest, and generation of at least one warning to be displayed by the display module in the reference visualization plane.

11. A non-transitory computer-readable medium including a computer program product comprising software instructions which, when implemented by the computer equipment, implement the display management method according to claim 10.

* * * * *